(12) United States Patent
Chen et al.

(10) Patent No.: US 9,659,115 B2
(45) Date of Patent: May 23, 2017

(54) THERMAL ANALYSIS FOR TIERED SEMICONDUCTOR STRUCTURE

(71) Applicant: Taiwan Semiconductor Manufacturing Company Limited, Hsin-Chu (TW)

(72) Inventors: Chih-Liang Chen, Hsinchu (TW); Jiann-Tyng Tzeng, Hsin Chu (TW); Shu-Hui Sung, Hsinchu County (TW); Charles Chew-Yuen Young, Cupertino, CA (US)

(73) Assignee: TAIWAN SEMICONDUCTOR MANUFACTURING COMPANY LIMITED, Hsin-Chu (TW)

( * ) Notice: Subject to any disclaimer, the term of this patent is extended or adjusted under 35 U.S.C. 154(b) by 729 days.

(21) Appl. No.: 14/133,840

(22) Filed: Dec. 19, 2013

(65) Prior Publication Data

US 2015/0179529 A1 Jun. 25, 2015

(51) Int. Cl.
*G06F 17/50* (2006.01)
*G01R 31/28* (2006.01)
*H01L 27/06* (2006.01)

(52) U.S. Cl.
CPC ..... *G06F 17/5009* (2013.01); *G01R 31/2874* (2013.01); *G06F 17/5068* (2013.01); *G06F 17/5081* (2013.01); *G06F 2217/78* (2013.01); *G06F 2217/80* (2013.01); *H01L 27/0688* (2013.01)

(58) Field of Classification Search
CPC ............. G06F 2217/80; G06F 17/5068; G06F 17/5081
USPC ................. 716/132, 110, 137, 126, 130, 135
See application file for complete search history.

(56) References Cited

U.S. PATENT DOCUMENTS

| | | | | |
|---|---|---|---|---|
| 7,383,520 | B2* | 6/2008 | Chandra | G06F 17/50 716/111 |
| 7,401,304 | B2* | 7/2008 | Li | G06F 17/5009 716/111 |
| 7,472,363 | B1* | 12/2008 | Chandra | G06F 17/5009 716/106 |
| 8,103,996 | B2* | 1/2012 | Kariat | G06F 17/5018 716/100 |
| 8,527,918 | B2* | 9/2013 | Cheng | G06F 17/5068 716/110 |
| 8,549,462 | B2* | 10/2013 | Malladi | G06F 17/5036 716/136 |
| 2005/0166168 | A1* | 7/2005 | Chandra | G06F 17/5009 716/113 |

(Continued)

Primary Examiner — Stacy Whitmore
(74) Attorney, Agent, or Firm — Cooper Legal Group, LLC

(57) ABSTRACT

Among other things, one or more systems and techniques for analyzing a tiered semiconductor structure are provided. One or more segments are defined for the tiered semiconductor structure. The one or more segments are iteratively evaluated during electrical simulation while taking into account thermal properties to determine power metrics for the segments. The power metrics are used to determine temperatures generated by integrated circuitry within the segments. Responsive to a segment having a temperature above a temperature threshold, a temperature action plan, such as providing an alert or inserting one or more thermal release structures into the segment, is implemented. In this way, the one or more segments are iteratively evaluated to identify and resolve thermal and reliability issues.

20 Claims, 11 Drawing Sheets

(56) References Cited

U.S. PATENT DOCUMENTS

| | | | |
|---|---|---|---|
| 2007/0157137 A1* | 7/2007 | Chandra | G06F 17/5009 716/113 |
| 2008/0163135 A1* | 7/2008 | Chandra | G06F 17/50 716/111 |
| 2008/0243461 A1* | 10/2008 | Li | G06F 17/5009 703/13 |
| 2009/0024969 A1* | 1/2009 | Chandra | G06F 17/5009 716/106 |
| 2009/0164183 A1* | 6/2009 | Smith | G06F 17/5018 703/6 |
| 2009/0224356 A1* | 9/2009 | Chandra | G06F 17/5009 257/499 |
| 2009/0319965 A1* | 12/2009 | Kariat | G06F 17/5018 716/119 |
| 2012/0038057 A1* | 2/2012 | Bartley | H01L 23/3677 257/774 |
| 2012/0210285 A1* | 8/2012 | Kariat | G06F 17/5018 716/112 |
| 2014/0208280 A1* | 7/2014 | Xu | G06F 17/5081 716/112 |
| 2015/0143311 A1* | 5/2015 | Chang | G06F 17/5081 716/111 |

* cited by examiner

700 ⇦

|  |  | Initial (°C) — 702 | Loop1 (°C) — 704 | Loop2 (°C) — 706 |
|---|---|---|---|---|
| Segment1 | tier1 — 404 | 25 | 75 | 80 |
|  | tier2 — 418 | 25 | 86 | 95 |
| Segment2 | tier1 — 406 | 25 | 71 | 75 |
|  | tier2 — 420 | 25 | 91 | (100) — 708 |
| Segment3 | tier1 — 408 | 25 | 75 | 84 |
|  | tier2 — 422 | 25 | 86 | 95 |
| Segment4 | tier1 — 410 | 25 | 76 | 80 |
|  | tier2 — 424 | 25 | 86 | 95 |
| Segment5 | tier1 — 412 | 25 | 75 | 81 |
|  | tier2 — 426 | 25 | 95 | (105) — 710 |
| Segment6 | tier1 — 414 | 25 | 80 | 85 |
|  | tier2 — 428 | 25 | 90 | (100) — 712 |

| | | Initial (°C) | Loop1 (°C) | Loop2 (°C) | Loop3 (°C) | Loop4 (°C) |
|---|---|---|---|---|---|---|
| Segment1 | 404 tier1 | 25 | 75 | 80 | 81 | 82 |
| | 418 tier2 | 25 | 86 | 95 | 96 | 97 |
| Segment2 | 406 tier1 | 25 | 71 | 75 | 78 | 79 — 806 |
| | 420 tier2 | 25 | 91 | 100 | 103 | 103 |
| Segment3 | 408 tier1 | 25 | 75 | 84 | 84.7 | 85 |
| | 422 tier2 | 25 | 86 | 95 | 97 | 97.5 |
| Segment4 | 410 tier1 | 25 | 76 | 80 | 82 | 83 |
| | 424 tier2 | 25 | 86 | 95 | 97 | 98 |
| Segment5 | 412 tier1 | 25 | 75 | 81 | 84 | 84 — 808 |
| | 426 tier2 | 25 | 95 | 105 | 106 | 107 |
| Segment6 | 414 tier1 | 25 | 80 | 85 | 88 | 89 — 810 |
| | 428 tier2 | 25 | 90 | 100 | 102 | 102 |

FIG. 8

THERMAL ANALYSIS FOR TIERED SEMICONDUCTOR STRUCTURE

BACKGROUND

A tiered semiconductor structure, such as a three dimensional (3D) stacked complementary metal oxide semiconductor (CMOS) structure, comprises one or more tiers within which semiconductor structures, such as integrated circuits, are formed. A bonding material, such as silicon oxide or other dielectric material, is used to bond tiers together within the tiered semiconductor structure.

DESCRIPTION OF THE DRAWINGS

FIG. 7 is an illustration of a set of thermal analysis characteristics, according to some embodiments.

FIG. 8 is an illustration of a set of thermal analysis characteristics, according to some embodiments.

DETAILED DESCRIPTION

Figure 1:
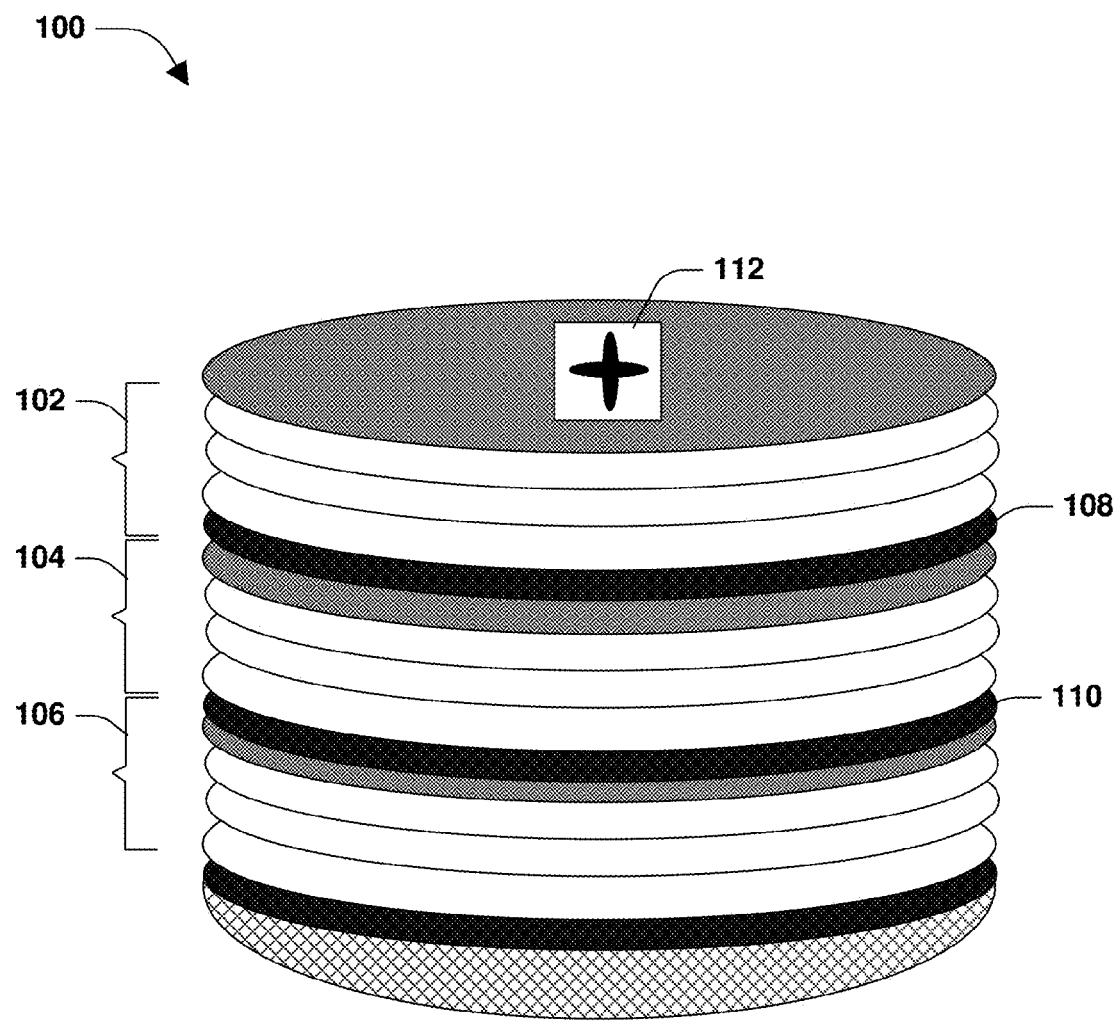
FIG. 1 is an illustration of a tiered semiconductor structure, according to some embodiments.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter.

One or more systems and techniques for analyzing a tiered semiconductor structure, are provided herein. The tiered semiconductor structure comprises one or more tiers that are bonded together using a bonding material, such as a bonding dielectric or oxide. The bonding material has relatively high thermal resistance and relatively low thermal conductance, and thus the bonding material induces temperature differentiations between tiers. In some embodiments where a top tier comprises a heat dissipation device, such as a fan or heat sink, and a bottom tier does not comprise a heat dissipation device, the top tier dissipates heat through the heat dissipation device, but the bottom tier is restricted from dissipating heat to the top tier for dissipation by the heat dissipation device. The bottom tier is restricted from dissipating heat due to the bonding material between the top tier and the bottom tier restricting heat transfer from the bottom tier to the top tier. Accordingly, as provided herein, thermal analysis, electrical analysis, and reliability analysis are implemented during simulation of the tiered semiconductor structure to take into account thermal properties and thermal behavior within the tiered semiconductor structure. In some embodiments, alerts are provided for temperatures exceeding a threshold. In some embodiments, thermal release structures, such as in-tier vias, are inserted into the tiered semiconductor structure for thermal release. In some embodiments, re-do Place & Route of one or more electrical structures within the tiered semiconductor structure is performed to address temperature issues. In this way, temperature issues are identified and addressed based upon the thermal properties and thermal behavior in order to mitigate thermal and reliability issues, thus improving design and simulation for tiered semiconductor structures.

FIG. 1 illustrates a tiered semiconductor structure 100. The tiered semiconductor structure 100, such as a stacked CMOS structure, comprises one or more tiers, such as a first tier 102, a second tier 104, a third tier 106, or other tiers not illustrated. Bonding material is used to bond the tiers together, such as a first bonding layer 108 that bonds the first tier 102 to the second tier 104, and a second bonding layer 110 that bonds the second tier 104 to the third tier 106. In some embodiments, one or more integrated circuits are formed within a tier or across one or more tiers. Such integrated circuits generate heat during operation. In some embodiments, the first tier 102 comprises a heat release structure 112, such as a fan, that dissipates heat generated by the first tier 102. However, the second tier 104 is restricted by the first bonding layer 108 from transferring heat to the first tier 102 for dissipation through the heat release structure 112, thus resulting in a temperature differential between the first tier 102 and the second tier 104. Similarly, the third tier 106 is restricted by the second bonding layer 110 and the first bonding layer 108 from transferring heat to the first tier 102 for dissipation through the heat release structure 112, thus resulting in a temperature differential between the first tier 102 and the third tier 106. The relatively higher temperature of the second tier 104 and the third tier 106 results in reliability issues for the tiered semiconductor structure 100. Accordingly, as provided herein, thermal properties and thermal behavior is taken into account during simulation so that reliability is increased, such as by insertion of thermal release structures in the second tier 104 and the third tier 106, such as in-tier vias.

Figure 2:
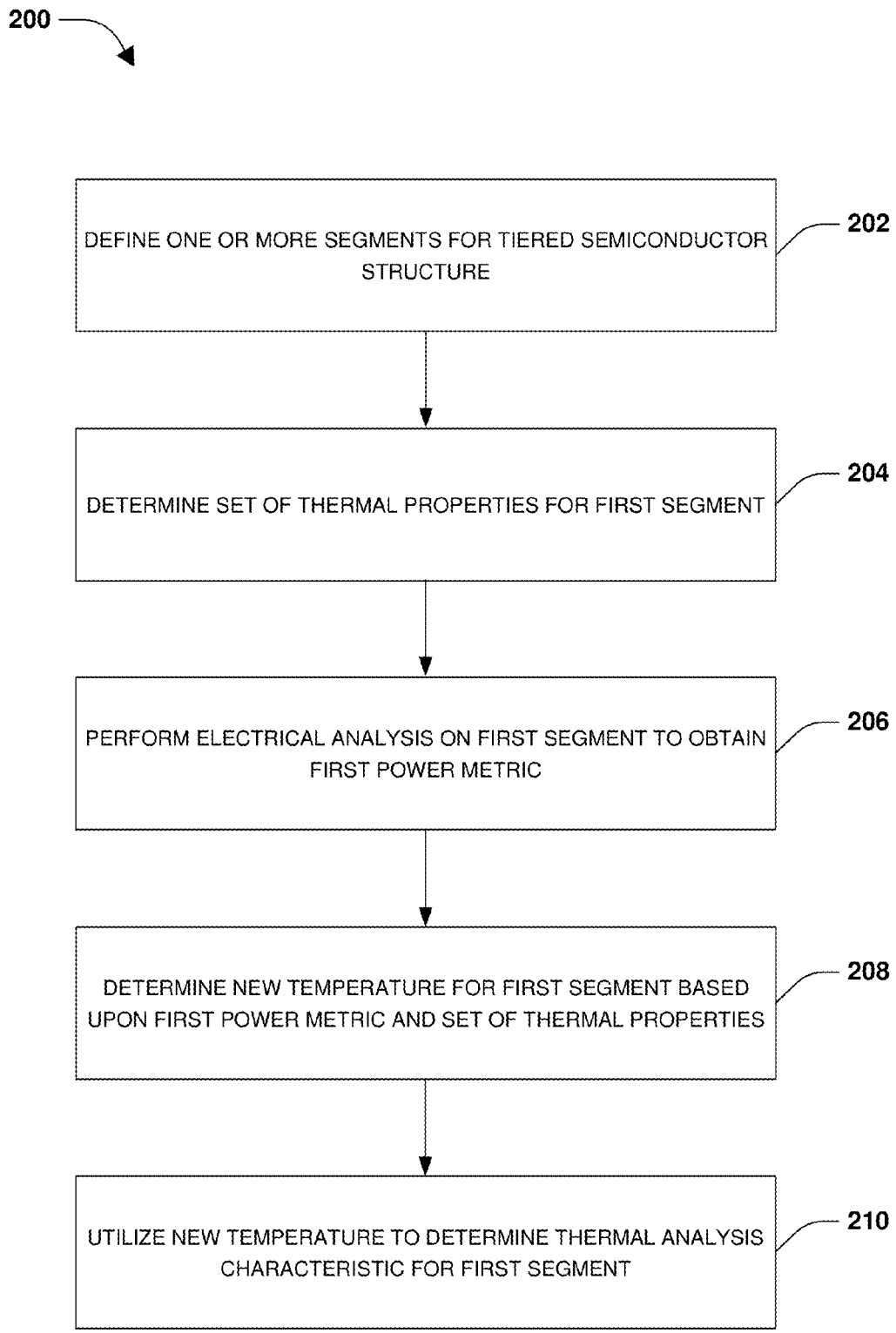
FIG. 2 is a flow diagram illustrating a method of analyzing a tiered semiconductor structure, according to some embodiments.
Figure 3:
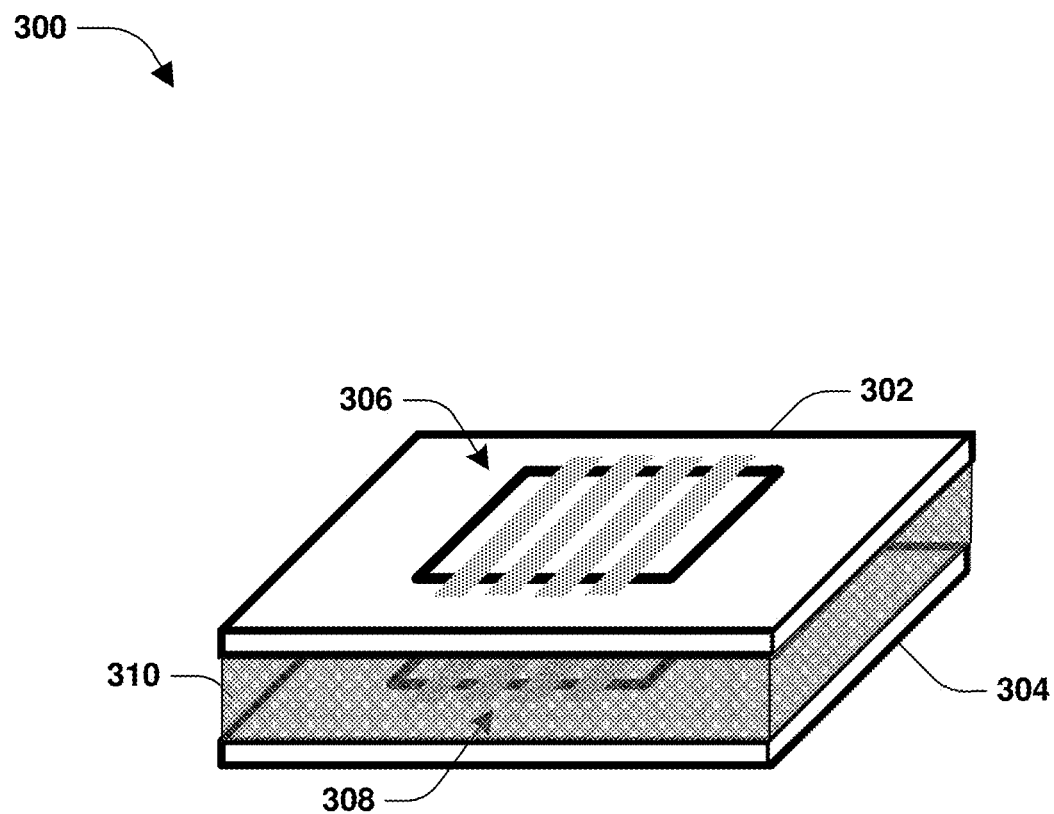
FIG. 3 is an illustration of a tiered semiconductor structure comprising a first tier and a second tier, according to some embodiments.

A method 200 of analyzing a tiered semiconductor structure is illustrated in FIG. 2. In some embodiments, a tiered semiconductor structure 300 comprises a first tier 302 and a second tier 304, as illustrated in FIG. 3. It is appreciated that the tiered semiconductor structure 300 can comprise any number of tiers, and that merely two tiers are illustrated for simplicity. The first tier 302 is bonded to the second tier 304 by a bonding layer 310, such as a dielectric material or an oxide material having a relatively high thermal resistance and a relatively low thermal conductivity. The first tier 302 comprises a first semiconductor structure 306, and the second tier 304 comprises a second semiconductor structure 308. The first semiconductor structure 306 and the second semiconductor structure 306 generate heat during operation. The bonding layer 310 restricts the second tier 304 from transferring heat, generated by the second semiconductor structure 308, to the first tier 302.

Figure 4:
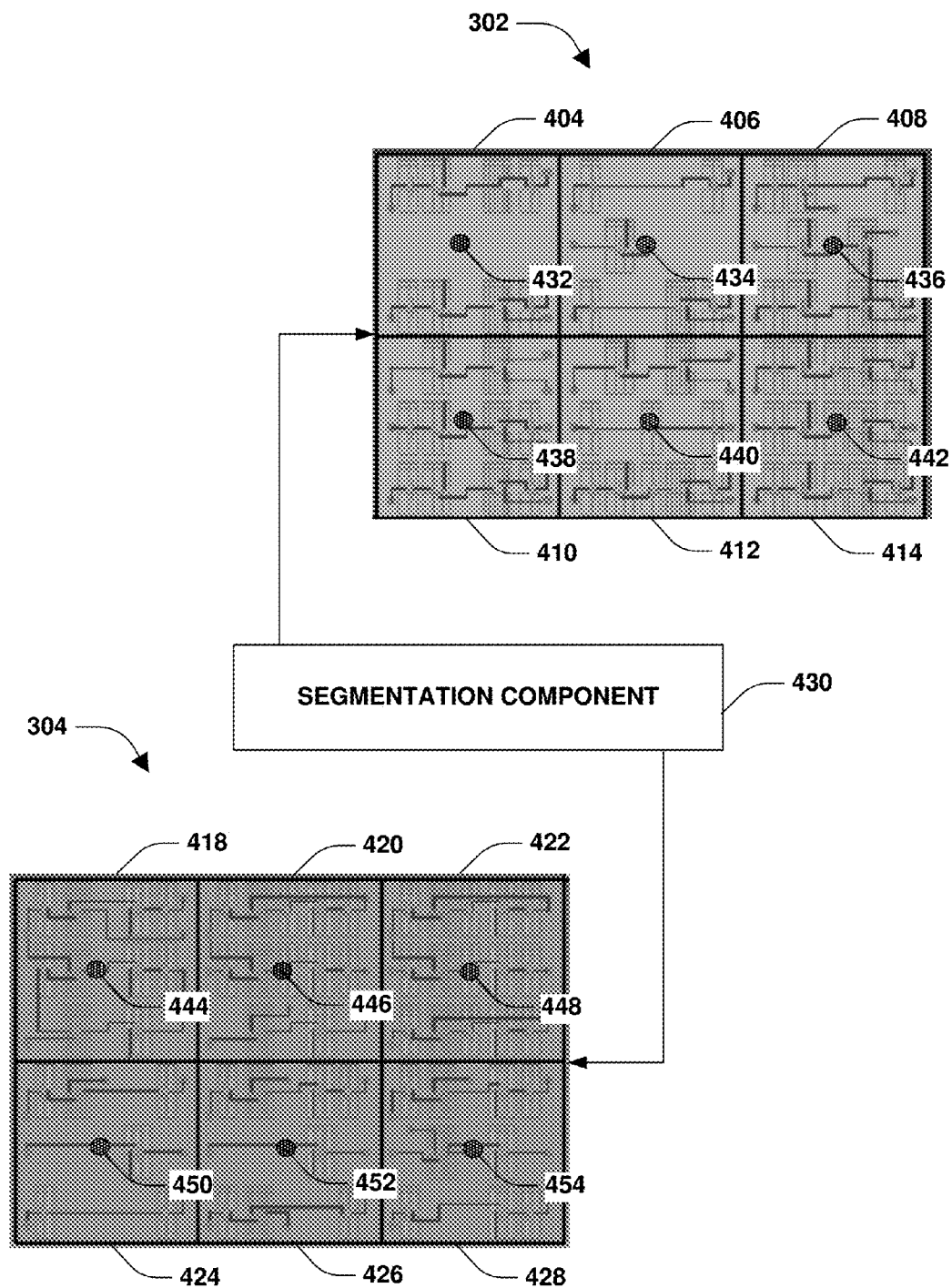
FIG. 4 is an illustration of a system for defining one or more segments in a tiered semiconductor structure, according to some embodiments.

At 202, one or more segments for the tiered semiconductor structure 300 are defined. In some embodiments, a segmentation component 430 is configured to define the one or more segments, as illustrated in FIG. 4. In some embodiments, the segmentation component 430 defines a segment based upon an inter-via count, such as a number of vias formed through a layer within an area region. In some embodiments, the segmentation component 430 defines a segment based upon a device count, such as a number of active devices within an area region. In some embodiments, the segmentation component 430 defines a segment based upon a metal coverage metric, such as an amount or percentage of metal or conductive material within an area region. In this way, the segmentation component 430 defines one or more segments based upon at least one of the inter-via count, the device count, the metal coverage metric, or a combination thereof. In some embodiments, the segmentation component 430 identifies a first area region and a second area region within the tiered semiconductor structure 300. The segmentation component 430 merges the first area region and the second area region into a segment based upon at least one of an inter-via count similarity metric between the first area region and the second area region, a device count similarity metric between the first area region and the second area region, or a metal coverage similarity metric between the first area region and the second area region. In this way, similar area regions are merged into segments.

In some embodiments, the segmentation component 430 defines, for the first tier 302, a first segment 404 comprising integrated circuitry that generates heat 432, a second segment 406 comprising integrated circuitry that generates heat 434, a third segment 408 comprising integrated circuitry that generates heat 436, a fourth segment 410 comprising integrated circuitry that generates heat 438, a fifth segment 412 comprising integrated circuitry that generates heat 440, and a sixth segment 414 comprising integrated circuitry that generates heat 442, as illustrated in FIG. 4. In some embodiments, the segmentation component 430 defines, for the second tier 304, a first segment 418 comprising integrated circuitry that generates heat 444, a second segment 420 comprising integrated circuitry that generates heat 446, a third segment 422 comprising integrated circuitry that generates heat 448, a fourth segment 424 comprising integrated circuitry that generates heat 450, a fifth segment 426 comprising integrated circuitry that generates heat 452, and a sixth segment 428 comprising integrated circuitry that generates heat 454, as illustrated in FIG. 4.

Figure 5:
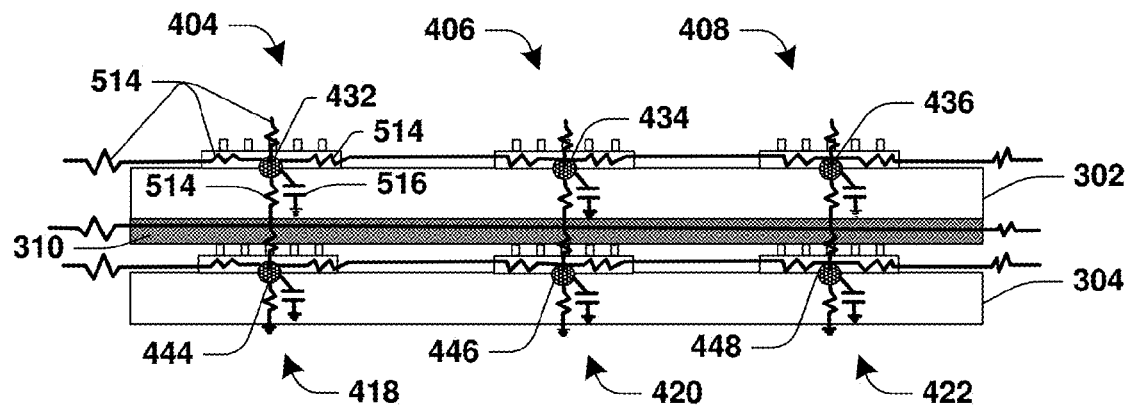
FIG. 5 is an illustration of a cross-sectional view of a tiered semiconductor structure, according to some embodiments.

At 204, a set of thermal properties are determined for the first segment 404. In some embodiments, sets of thermal properties are determined for respective segments of the one or more segments. The set of thermal properties correspond to at least one of thermal resistance, thermal impedance, or thermal capacitance. In some embodiments, the first segment 404 has a thermal resistance 514 and a thermal capacitance 516, which affects how heat 432 is transferred between tiers, as illustrated in FIG. 5. In some embodiments, the thermal capacitance 516 is determined based upon material properties of the first segment 404. In some embodiments, if the thermal capacitance 516 is below a threshold value, then the thermal resistance 514, but not the thermal capacitance 516, is taken into account. In some embodiments, the thermal resistance 514 is determined based upon material properties of at least one of the first segment 404, the bonding layer 310, or other segments such as the first segment 418 and the second segment 406.

At 206, electrical analysis is performed on the first segment 404. In some embodiments, electrical analysis is performed on respective segments of the one or more segments. The electrical analysis is performed based upon at least one of an initial temperature or a time period in order to obtain a first power metric for the first segment 404. In some embodiments, electrical analysis is performed during simulation of the tiered semiconductor structure 300 by probing the first segment 404 according to the initial temperature for the time period to obtain the first power metric. In this way, the first power metric is obtained.

At 208, a new temperature is determined for the first segment based upon the first power metric and the set of thermal properties. In some embodiments, new temperatures are determined for respective segments of the one or more segments. The new temperature is determined based upon evaluating the set of thermal properties, such as at least one of the thermal resistance 514 or the thermal capacitance 516, using at least one of the initial temperature, the first power metric, or the time period. In some embodiments, quasi-transient analysis is performed to determine the new temperature. During quasi-transient analysis, the time period is segmented into one or more time segments. A set of time segment temperatures are calculated for the one or more time segments. The new temperature is determined based upon the set of time segment temperatures.

At 210, the new temperature is utilized to determine a thermal analysis characteristic for the first segment 404, such as whether the new temperature is indicative of the first segment 404 having potential reliability issues due to relatively high temperatures within the first segment 404. In some embodiments, responsive to the new temperature exceeding a temperature threshold, an alert is provided such as through a simulation interface used to simulate the tiered semiconductor structure 300. In some embodiments, responsive to the new temperature exceeding the temperature threshold, one or more thermal release structures, such as an in-tier via, are inserted into the first segment 404 such as into a layout design for the first segment 404. In some embodiments, a re-do Place & Route of one or more electrical structures is performed for the first segment 404. In some embodiments, the first segment 404, comprising the one or more thermal release structures, is evaluated to determine a second thermal analysis characteristic to determine whether the one or more thermal release structures provide an adequate means to release at least some of the heat 432 created by the integrated circuitry within the first segment 404.

Figure 6:
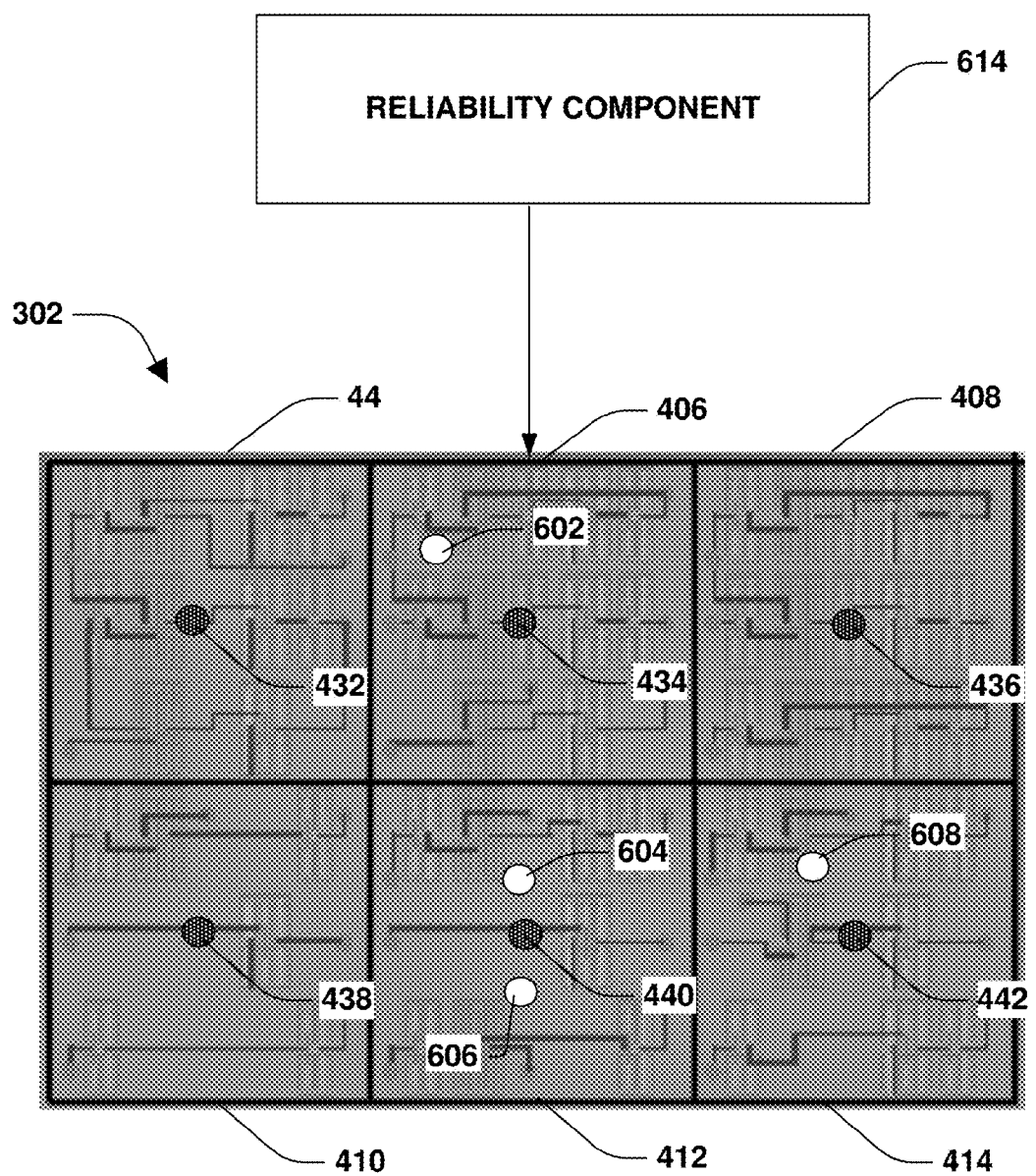
FIG. 6 is an illustration of a system for implementing a temperature action plan, according to some embodiments.

In some embodiments, a reliability component 614 is configured to insert one or more thermal release structures into the tiered semiconductor structure 300, as illustrated by FIG. 6. In some embodiments, responsive to a new temperature for the second segment 406 of the first tier 302 being above the temperature threshold, the reliability component 614 inserts a first thermal release structure 602 into the second segment 406 in order to facilitate release of heat 434. Responsive to a new temperature for the fifth segment 412 of the first tier 302 being above the temperature threshold, the reliability component 614 inserts a second thermal release structure 604 and a third thermal release structure 606 into the fifth segment 412 in order to facilitate release of heat 440. Responsive to a new temperature for the sixth segment 414 of the first tier 302 being above the temperature threshold, the reliability component 614 inserts a fourth thermal release structure 608 into the sixth segment 414 in order to facilitate release of heat 442. In this way, reliability is improved for the tiered semiconductor structure 300 by identify and resolving thermal and reliability issues.

In some embodiments, the one or more segments are iteratively evaluated until at least one segment has a new temperature above a temperature threshold, as illustrated in FIG. 7. A set of thermal analysis characteristics 700 comprise an initial temperature 702, such as about 25° C., used to identify a first set of new temperatures 704 for the one or more segments during a first iteration, such as about 75° C. for the first segment 404 of the first tier 302, about 86° C. for the first segment 418 of the second tier 304, about 71° C. for the second segment 406 of the first tier 302, about 91° C. for the second segment 420 of the second tier 304, etc. The one or more segments are evaluated using the first set of new temperatures 704 during a second iteration to identify a second set of new temperatures 706. In some embodiments of performing a second iteration for the first segment 404 of the first tier 302, a second iteration of the electrical analysis is performed on the first segment 404 based upon the new temperature of about 75° C. to obtain a second power metric. A second new temperature of about 80° C. is determined for the first segment 404 based upon the second power metric. In this way, the second set of new temperatures 706 is determined for the one or more segments using the first set of new temperatures 704. In some embodiments, a temperature threshold of about 98° C. is specified. A second new temperature 708 of about 100° C. for the second segment 420 of the second tier 304, a second new temperature 710 of about 105° C. for the fifth segment 426 of the second tier 304, and a second new temperature 712 of about 100° C. for the sixth segment 428 of the second tier 304 is identified as exceeding the temperature threshold. Accordingly, a thermal action plan is implemented, such as providing an alert or inserting one or more thermal release structures into such segments. In this way, the one or more segments are iteratively evaluated to identify and resolve thermal and reliability issues.

In some embodiments, the one or more segments are iteratively evaluated until temperature convergence is detected, as illustrated in FIG. 8. In some embodiments, the first set of new temperatures 704 was determined based upon performing a first iteration of evaluating the one or more segments, and the second set of new temperatures 706 was determined based upon performing a second iteration of evaluating the one or more segments using the first set of new temperatures 704 (e.g., FIG. 7). If temperature convergence is not detected, then a third set of new temperatures 802 is determined based upon performing a third iteration of evaluating the one or more segments using the second set of new temperatures 706. If temperature convergence is not detected, then a fourth set of new temperatures 804 is determined based upon performing a fourth iteration of evaluating the one or more segments using the third set of new temperatures 804. In some embodiments, a first temperature convergence 806 is identified for the second segment 420 of the second tier 304, a second temperature convergence 808 is identified for the fifth segment 426 of the second tier 304, and a third temperature convergence 810 is identified for the sixth segment 428 of the second tier 304, where the first temperature convergence 806, the second temperature convergence 810, and the third temperature convergence 810 exceed a temperature threshold, such as about 100° C. Accordingly, a thermal action plan is implemented, such as providing an alert or inserting one or more thermal release structures into such segments. In this way, the one or more segments are iteratively evaluated to identify and resolve thermal and reliability issues.

Figure 9:
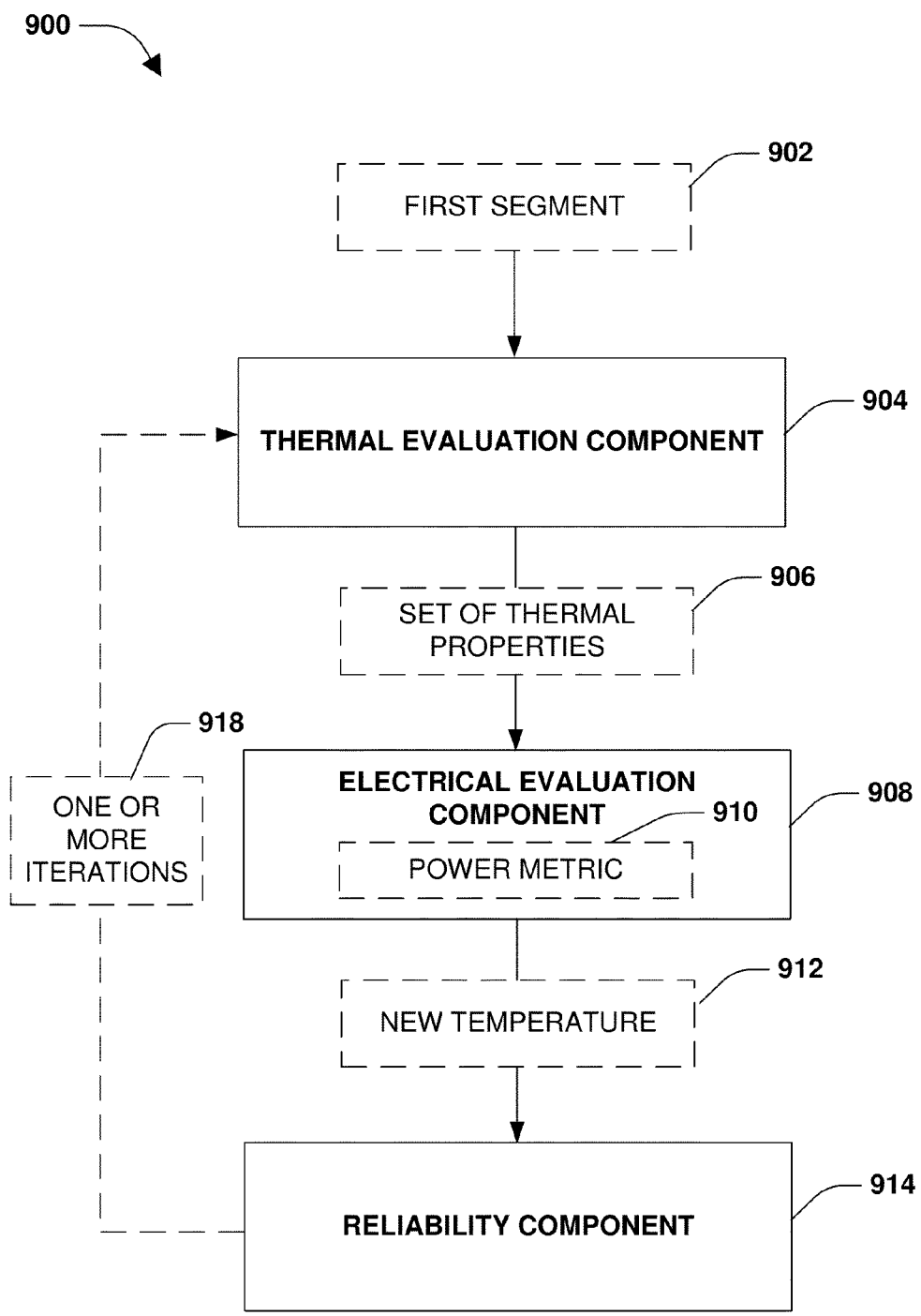
FIG. 9 is an illustration of a system for analyzing a tiered semiconductor structure, according to some embodiments.

FIG. 9 illustrates a system 900 for analyzing a tiered semiconductor structure. The system 900 comprises a thermal evaluation component 904, an electrical evaluation component 908, and a reliability component 914. The thermal evaluation component 904 is configured to determine a set of thermal properties 906 for one or more segments, such as a first segment 902, of the tiered semiconductor structure. In some embodiments, the set of thermal properties 906 comprise at least one of a thermal resistance, a thermal impedance, or a thermal capacitance. In some embodiments, the thermal capacitance is not taken into account if the thermal capacitance is below a threshold value. In some embodiments, the thermal evaluation component 904 derives the set of thermal properties 906 from material properties of the first segment 902 or other segments within the tiered semiconductor structure.

The electrical evaluation component 908 is configured to perform electrical analysis on the first segment 902 based upon at least one of an initial temperature or a time period in order to obtain a power metric 910. The electrical evaluation component 908 is configured to determine a new temperature 912 for the first segment 902 based upon the power metric 910 and the set of thermal properties 906. In some embodiments, if electrical timing properties, identified during the electrical analysis, do not satisfy an original design requirement, then at least one of an alert or an electrical redesign request is provided. The reliability component 914 is configured to implement a temperature action plan, such as providing an alert or inserting one or more thermal release structures into the first segment 902 segments, responsive to the new temperature 912 exceeding a temperature threshold. In some embodiments, one or more iterations 918 are performed for evaluating the first segment 902, such as until a temperature convergence is identified or the temperature threshold is exceeded. In this way, the first segment 902 is iteratively evaluated to identify and resolve thermal and reliability issues.

Figure 10:
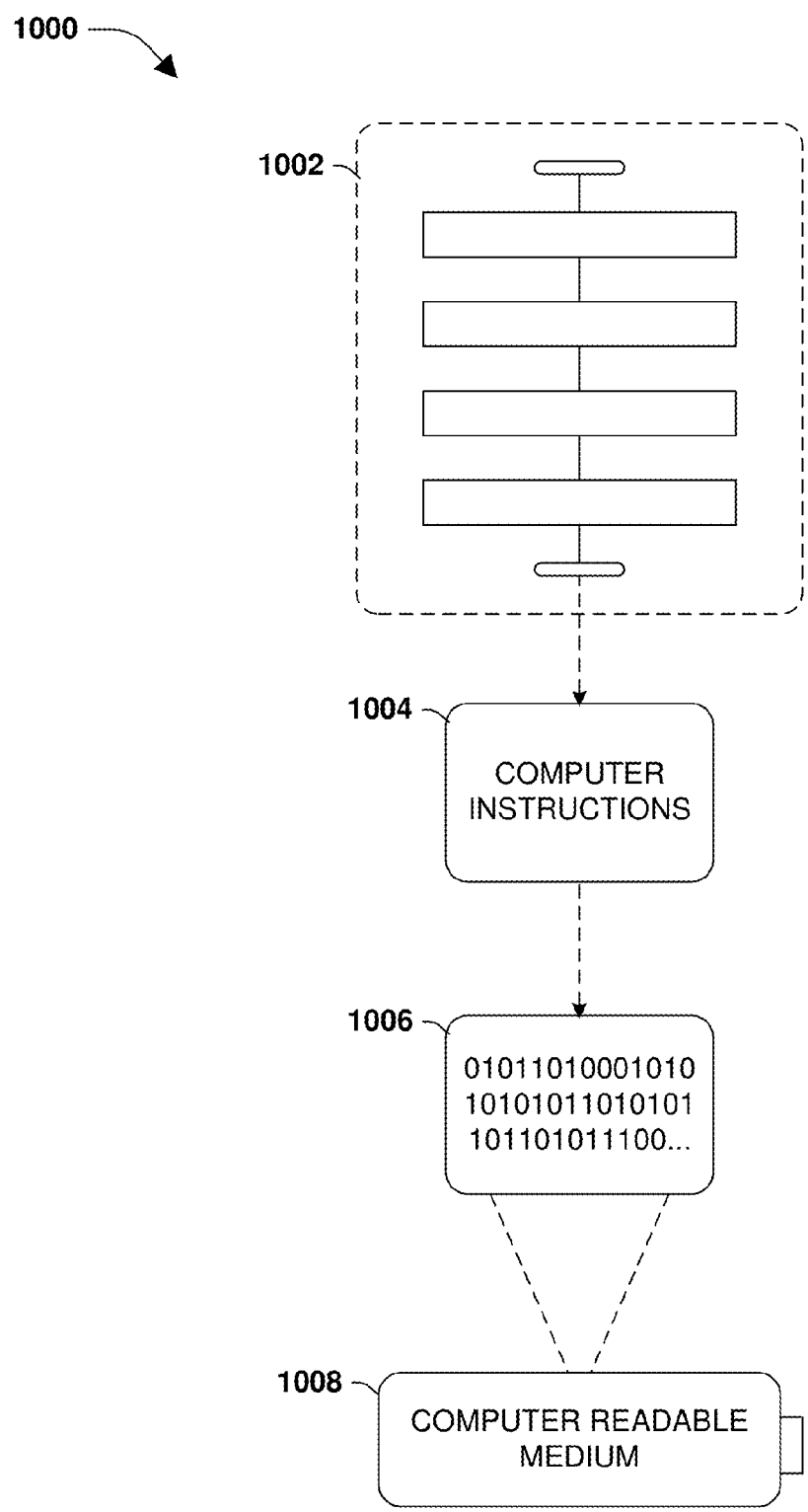
FIG. 10 is an illustration of an example computer-readable medium wherein processor-executable instructions configured to embody one or more of the provisions set forth herein may be comprised.

Still another embodiment involves a computer-readable medium comprising processor-executable instructions configured to implement one or more of the techniques presented herein. An exemplary computer-readable medium is illustrated in FIG. 10, wherein the implementation 1000 comprises a computer-readable medium 1008 (e.g., a CD-R, DVD-R, flash drive, a platter of a hard disk drive, etc.), on which is encoded computer-readable data 1006. This computer-readable data 1006 in turn comprises a set of computer instructions 1004 configured to operate according to one or more of the principles set forth herein. In an embodiment 1000, the processor-executable computer instructions 1004 are configured to perform a method 1002, such as at least some of the exemplary method 200 of FIG. 2. In an embodiment, the processor-executable instructions 1012 are configured to implement a system, such as at least some of the exemplary system 400 of FIG. 4, at least some of the exemplary system 600 of FIG. 6 or at least some of the exemplary system 900 of FIG. 9. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 11:
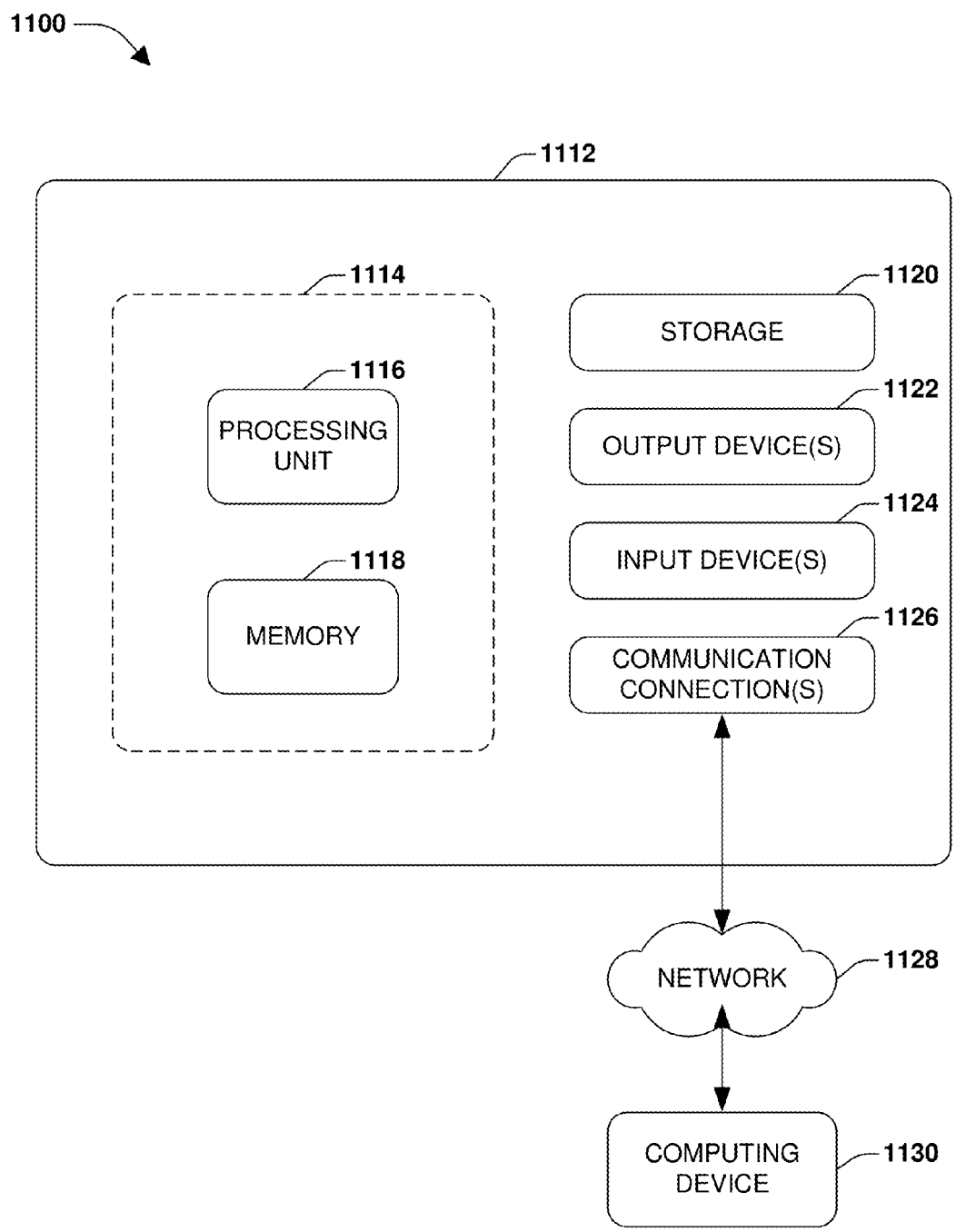
FIG. 11 illustrates an example computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1100 comprising a computing device 1112 configured to implement one or more embodiments provided herein. In one configuration, computing device 1112 includes at least one processing unit 1116 and memory 1118. Depending on the exact configuration and type of computing device, memory 1118 may be volatile (such as RAM, for example), non-volatile (such as ROM, flash memory, etc., for example) or some combination of the two. This configuration is illustrated in FIG. 11 by dashed line 1114.

In other embodiments, device 1112 may include additional features and/or functionality. For example, device 1112 may also include additional storage (e.g., removable and/or non-removable) including, but not limited to, magnetic storage, optical storage, and the like. Such additional storage is illustrated in FIG. 11 by storage 1120. In some embodiments, computer readable instructions to implement one or more embodiments provided herein may be in storage 1120. Storage 1120 may also store other computer readable instructions to implement an operating system, an application program, and the like. Computer readable instructions may be loaded in memory 1118 for execution by processing unit 1116, for example.

The term "computer readable media" as used herein includes computer storage media. Computer storage media includes volatile and nonvolatile, removable and non-removable media implemented in any method or technology for storage of information such as computer readable instructions or other data. Memory 1118 and storage 1120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1112. Any such computer storage media may be part of device 1112.

Device 1112 may also include communication connection(s) 1126 that allows device 1112 to communicate with other devices. Communication connection(s) 1126 may include, but is not limited to, a modem, a Network Interface Card (NIC), an integrated network interface, a radio frequency transmitter/receiver, an infrared port, a USB connection, or other interfaces for connecting computing device 1112 to other computing devices. Communication connection(s) 1126 may include a wired connection or a wireless connection. Communication connection(s) 1126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1112 may include input device(s) 1124 such as keyboard, mouse, pen, voice input device, touch input device, infrared cameras, video input devices, and/or any other input device. Output device(s) 1122 such as one or more displays, speakers, printers, and/or any other output device may also be included in device 1112. Input device(s) 1124 and output device(s) 1122 may be connected to device 1112 via a wired connection, wireless connection, or any combination thereof. In some embodiments, an input device or an output device from another computing device may be used as input device(s) 1124 or output device(s) 1122 for computing device 1112.

Components of computing device 1112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1112 may be interconnected by a network. For example, memory 1118 may be comprised of multiple physical memory units located in different physical locations interconnected by a network.

Those skilled in the art will realize that storage devices utilized to store computer readable instructions may be distributed across a network. For example, a computing device 1130 accessible via a network 1128 may store computer readable instructions to implement one or more embodiments provided herein. Computing device 1112 may access computing device 1130 and download a part or all of the computer readable instructions for execution. Alternatively, computing device 1112 may download pieces of the computer readable instructions, as needed, or some instructions may be executed at computing device 1112 and some at computing device 1130.

According to an aspect of the instant disclosure, a method for analyzing a tiered semiconductor structure is provided. The method comprises defining one or more segments for a tiered semiconductor structure. The one or more segments comprise a first segment. A set of thermal properties are determined for the first segment. Electrical analysis is performed on the first segment based upon at least one of an initial temperature or a time period to obtain a first power metric. A new temperature is determined for the first segment based upon the first power metric and the set of thermal properties. The new temperature is utilized to determine a thermal analysis characteristic for the first segment.

According to an aspect of the instant disclosure, a system for analyzing a tiered semiconductor structure is provided. The system comprises a thermal evaluation component configured to determine a set of thermal properties for a first segment of a tiered semiconductor structure. The system comprises an electrical evaluation component configured to perform electrical analysis on the first segment based upon at least one of the initial temperature or a time period to obtain a first power metric. The electrical evaluation component is configured to determine a new temperature for the first segment based upon the first power metric and the set of thermal properties. The system comprises a reliability component configured to implement a temperature action plan responsive to the new temperature exceeding a temperature threshold.

According to an aspect of the instant disclosure, a computer readable medium comprising instructions which when executed at least in part via a processing unit perform a method for analyzing a tiered semiconductor structure is provided. The method comprises iteratively evaluating a first segment of a tiered semiconductor structure until temperature convergence is detected for the first segment to determine a convergence temperature. A first iteration comprises determining a set of thermal properties for a first segment of a tiered semiconductor structure. Electrical analysis is performed on the first segment based upon at least one of an initial temperature or a time period to obtain a first power metric. A new temperature is determined for the first segment based upon the first power metric and the set of thermal properties. A determination is made as to whether temperature convergence occurs for the first segment based upon the new temperature. Responsive to the converged temperature exceeding a temperature threshold, a temperature action plan is implemented. The temperature action plan comprises at least one of providing an alert or inserting one or more thermal release structures into the first segment.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for analyzing a tiered semiconductor structure, comprising:
   defining one or more segments for a tiered semiconductor structure, the one or more segments comprising a first segment;
   determining a set of thermal properties for the first segment;
   performing electrical analysis on the first segment based upon an initial temperature and a time period to obtain a first power metric;
   determining a new temperature for the first segment based upon the first power metric and the set of thermal properties;
   utilizing the new temperature to determine a thermal analysis characteristic for the first segment, the thermal analysis characteristic identifying a potential reliability issue associated with the first segment; and
   responsive to the new temperature exceeding a temperature threshold, inserting one or more thermal release structures into the first segment to reduce a temperature of the first segment to mitigate the potential reliability issue, wherein at least one of the defining, the determining a set of thermal properties, the performing, the determining a new temperature, the utilizing, or the inserting is performed at least in part by a processing unit.

2. The method of claim 1, the defining one or more segments comprising:
defining the first segment based upon at least one of an inter-via count, a device count, or a metal coverage metric.

3. The method of claim 1, comprising:
identifying a first area region within the tiered semiconductor structure;
identifying a second area region within the tiered semiconductor structure; and
merging the first area region and the second area region into the first segment based upon at least one of an inter-via count similarity metric between the first area region and the second area region, a device count similarity metric between the first area region and the second area region, or a metal coverage similarity metric between the first area region and the second area region.

4. The method of claim 1, the set of thermal properties comprising at least one of a thermal resistance, a thermal impedance, or a thermal capacitance.

5. The method of claim 1, the determining a new temperature comprising:
evaluating the set of thermal properties using the initial temperature, the first power metric, and the time period to determine the new temperature.

6. The method of claim 1, the determining a new temperature comprising:
performing quasi-transient analysis to determine the new temperature.

7. The method of claim 6, the performing quasi-transient analysis comprising:
segmenting the time period into one or more time segments;
calculating a set of time segment temperatures for the one or more time segments; and
determining the new temperature based upon the set of time segment temperatures.

8. The method of claim 1, comprising:
responsive to the new temperature exceeding the temperature threshold, providing an alert.

9. The method of claim 1, comprising:
responsive to the new temperature exceeding the temperature threshold, performing a re-do Place and Route.

10. The method of claim 1, the one or more-a thermal release structures comprising in-tier vias.

11. The method of claim 1, comprising:
evaluating the first segment, comprising the one or more thermal release structures, to determine a second thermal analysis characteristic.

12. The method of claim 1, comprising:
iteratively evaluating the first segment to determine thermal analysis characteristics until temperature convergence is detected for the first segment.

13. The method of claim 1, comprising:
performing a second iteration of the electrical analysis on the first segment based upon the new temperature to obtain a second power metric;
determining a second new temperature for the first segment based upon the second power metric; and
utilizing the second new temperature to determine a second thermal analysis characteristic for the first segment.

14. A system for analyzing a tiered semiconductor structure, comprising:
a processing unit; and
memory comprising instructions that when executed by the processing unit cause operations to be performed, the operations comprising:
determining a set of thermal properties for a first segment of a tiered semiconductor structure;
performing electrical analysis on the first segment based upon an initial temperature and a time period to obtain a first power metric;
determining a new temperature for the first segment based upon the first power metric and the set of thermal properties; and
responsive to the new temperature exceeding a temperature threshold, implementing a temperature action plan comprising:
inserting one or more thermal release structures into the first segment to reduce a temperature of the first segment to mitigate a potential reliability issue associated with the new temperature.

15. The system of claim 14, the temperature action plan comprising providing an alert.

16. The system of claim 14, the operations comprising:
defining the first segment based upon at least one of an inter-via count, a device count, or a metal coverage metric.

17. The system of claim 14, the determining a new temperature comprising:
performing quasi-transient analysis to determine the new temperature.

18. The system of claim 17, the performing quasi-transient analysis comprising:
segmenting the time period into one or more time segments;
calculating a set of time segment temperatures for the one or more time segments; and
determining the new temperature based upon the set of time segment temperatures.

19. The system of claim 14, the set of thermal properties comprising at least one of a thermal resistance, a thermal impedance, or a thermal capacitance.

20. A non-transitory computer readable medium comprising instructions which when executed at least in part via a processing unit perform a method for analyzing a tiered semiconductor structure, the method comprising:
iteratively evaluating a first segment of a tiered semiconductor structure until temperature convergence is detected for the first segment to determine a converged temperature, a first iteration comprising:
determining a set of thermal properties for the first segment of the tiered semiconductor structure;
performing electrical analysis on the first segment based upon an initial temperature and a time period to obtain a first power metric;
determining a new temperature for the first segment based upon the first power metric; and
determining whether temperature convergence occurs for the first segment based upon the new temperature; and
responsive to the converged temperature exceeding a temperature threshold, implementing a temperature action plan comprising inserting one or more thermal release structures into the first segment to reduce a temperature of the first segment to mitigate a potential reliability issue.

* * * * *